Sept. 22, 1931.   H. J. WINTER   1,824,062
FLUID PRESSURE BRAKE FOR AIRPLANES
Filed Aug. 2, 1928

INVENTOR
HARRY J. WINTER
BY
Wm. N. Cady
ATTORNEY

Patented Sept. 22, 1931

1,824,062

UNITED STATES PATENT OFFICE

HARRY J. WINTER, OF LONDON, ENGLAND, ASSIGNOR TO THE WESTINGHOUSE AIR BRAKE COMPANY, OF WILMERDING, PENNSYLVANIA, A CORPORATION OF PENNSYLVANIA

FLUID PRESSURE BRAKE FOR AIRPLANES

Application filed August 2, 1928, Serial No. 296,918, and in Great Britain March 30, 1928.

This invention relates to fluid pressure braking apparatus for air-craft more particularly as applied to the landing wheels of airplanes for the purpose of retarding the speed of movement of the machine when manoeuvring on the ground, the invention having for its object to provide improved arrangements for controlling the braking action in apparatus of this character.

In order to provide for the complete control of the air-craft while running along the ground it is desirable that the pilot should be able independently to control the braking of the port and starboard landing wheels and according to the principal feature of the invention a control valve is provided comprising a single operating handle or member adapted to effect the supply of fluid under pressure to and its release from the brake cylinders of the port and starboard brakes either simultaneously or independently of one another.

In order that the nature of the invention may be clearly understood a preferred construction of control valve mechanism embodying one form of the invention will now be preferably described by way of example.

Figure 1:
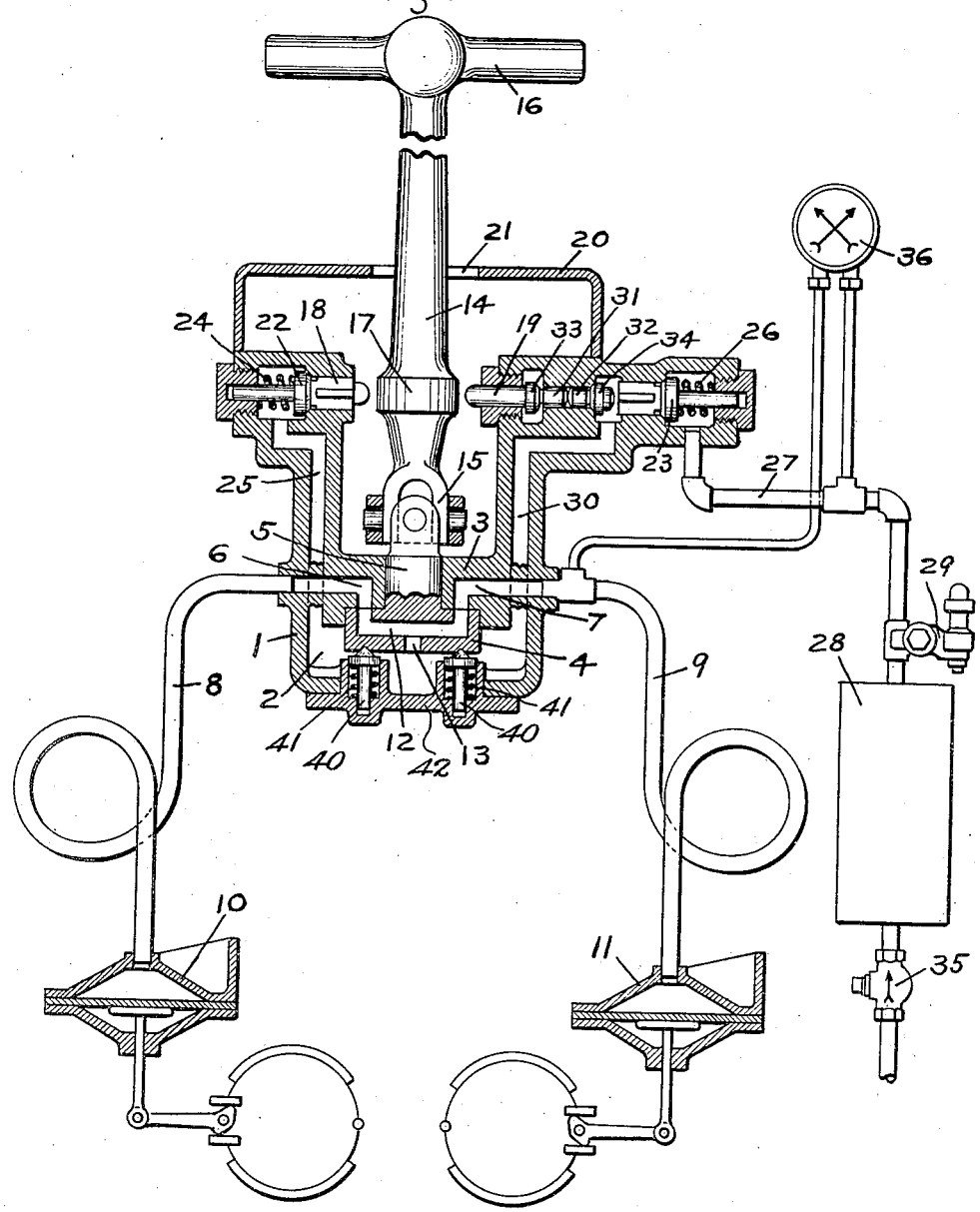
Figure 2:
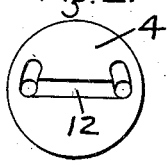

In the accompanying drawings; Fig. 1 is a diagrammatic view, partly in section, of a fluid pressure braking apparatus embodying my invention; and Fig. 2 a face view of the rotary valve employed.

As thus constructed the control valve comprises a body portion 1, the base of which constitutes a control chamber 2 closed at the top by a partition 3 forming an integral portion of the body of the valve, the lower face of this partition constituting a valve seat for a rotary valve 4. The latter comprises a substantially flat cylindrical valve member having a circular stem 5 projecting upwards through the partition and rotatably mounted therein in such a manner as to prevent the escape of fluid under pressure past the valve stem. The valve seat is provided with two diametrically opposite ports 6 and 7 leading through suitable passages in the body of the valve to flexible pipe connections 8 and 9 extending from the control valve to the port and starboard brake cylinders 10 and 11 mounted on the under-carriage of the aircraft.

The valve member 4 is provided with an interal transverse passage or cavity 12 terminating in ports in the face of the valve member in contact with the valve seat, these ports being arranged to register with the brake cylinder ports in the valve seat when the valve member is in its normal or central position. The valve member is also provided with a central port or passage 13 establishing communication between the transverse passage above referred to and the interior of the control chamber 2. The ports in the valve member are of elongated form so that when the valve member is in its normal or central position above referred to, communication is established between the control chamber and both of the passages leading to the brake cylinders whereas when the valve member is rotated in one direction through a predetermined arc the port in the valve seat leading to the port brake cylinder no longer registers with the corresponding port in the valve member, the port in the valve seat leading to the starboard brake cylinder however being still in communication with the corresponding port in the valve member owing to the elongated form of this latter port.

Conversely when the valve member is rotated through a predetermined arc in the opposite direction from its normal or central position the port in the valve seat leading to the starboard brake cylinder no longer registers with the corresponding port in the valve member, the other port in the valve member continuing to register with the port in the valve seat leading to the port brake cylinder.

It will thus be seen that when the valve member occupies its central position communication is established between the control chamber and both the port and starboard brake cylinders whereas by rotating the valve member in one direction or the other from this central position communication between the control chamber and the port or starboard brake cylinder is cut off, communication between the control chamber and the other brake cylinder being however maintained.

The upper portion of the stem 5 of the valve member projecting through the partition above referred to is connected by means of a universal joint 15 to the lower end of a vertical rod 14 terminating at its upper end in a cross handle 16 and constituting the manually operated controlling element of the valve. At a point intermediate its length the vertical rod is provided with a cylindrical enlargement 17 which by deflecting the rod from its normal or vertical position in one direction or the other is adapted to engage with one or other of two plungers 18 or 19 projecting from the upper part of the body of the valve. This portion of the body is substantially in the form of a cup the base of which is constituted by the partition above referred to, the vertical rod 14 being co-axially arranged within the cup and extending beyond the upper end thereof which is provided with a suitable cap or cover 20 having a central aperture 21 through which the vertical rod projects.

The plungers above referred to project radially inwards from the edge of the cup portion of the body of the valve adjacent to the top thereof, the valves 22 and 23 operated by these plungers being arranged in cylindrical extensions of the valve body projecting radially outwards from the cup portion. In one of these extensions the release valve is located being constituted by the poppet valve 22 normally held on its seat by a suitable spring 24 and adapted to be moved to its open position by the plunger 18 projecting towards the vertical rod of the operating element. The inner side of this valve is in communication through a suitable vertical passage formed within the wall of the cup portion with the control chamber 2 in the lower portion of the body of the valve.

The other cylindrical extension above referred to contains an inlet valve which is constituted by the poppet valve 23 normally held upon its seat by a suitable spring 26 one side of this valve being in communication through suitable pipe connections 27 with an air reservoir 28, these pipe connections preferably containing a pressure reducing valve 29. The other side of the inlet valve communicates through a suitable vertical passage 30 formed in the wall of the cup portion of the valve body with the control chamber, and the inlet valve is arranged to be opened by means of a plunger formed in two parts 31 and 32. One part 31 of the plunger viz. that nearest to the vertical rod or operating element, projects at one end radially towards this element, the other end of the plunger being provided with a collar 33 adapted when the plunger is moved radially outwards to engage with a bevelled seat and thus prevent leakage of fluid past the collar. The extreme end of this portion of the plunger when the plunger is displaced is adapted to engage with the abutting end of a second plunger element 32, the opposite end of which carries a similar collar 34 adapted to engage with a bevelled seat when this portion of the plunger is in its innermost position, that is to say when the other portion of the plunger is not being moved outwards by the action of the control element. The end of this second plunger portion beyond the collar is adapted to engage directly with the stem of the inlet valve and it will thus be seen that when the vertical rod 14 of the control element is in its normal or vertical position the inlet valve 23 is closed and the escape of fluid from the control chamber 2 is prevented by the second portion 32 of the plunger above referred to owing to the engagement of the collar 34 thereon with its bevelled seat. When on the other hand the other portion 31 of the plunger is moved outwards by the engagement therewith of the cylindrical enlargement 17 of the vertical rod 14 of the control element the inlet valve 23 is opened and the escape of fluid under pressure from the control chamber 2 past the plunger is prevented by the engagement of the collar 33 on the first portion 31 of the plunger with its bevelled seat.

The air reservoir above referred to is preferably arranged to be supplied with fluid under pressure from a suitable air compressor (not shown) through a check or non-return valve 35 and a duplex pressure gauge 36 is preferably provided having suitable pipe connections whereby the pressure in the brake cylinder or cylinders and the pressure in the air reservoir may be indicated to the pilot.

The brake cylinders may be of the piston or diaphragm type and are preferably arranged to operate band brakes on the port and starboard landing wheels respectively of the under-carriage.

When it is desired to effect an application of the brakes the vertical rod 14 of the operating handle is displaced from its normal or vertical position so as to engage with the corresponding plunger 19 of the inlet valve 23 which being thereby opened admits fluid under pressure from the air reservoir 28 to the control chamber 2 and thence through the central port 13 in the rotary valve member to the transverse passage 12 within this member. Thence fluid under pressure is supplied from the transverse passage through the ports in the valve face and the corresponding ports in the valve seat to the port and starboard brake cylinders. As soon as the desired pressure therein has been effected the operating handle is returned to its normal position with the result that the inlet valve closes and the supply of fluid under pressure to the brake cylinders is cut off.

In order to release the brakes the operating handle is displaced from its vertical position in the opposite direction so as to engage with the plunger 18 of the release valve 22, fluid under pressure being thereby vented to the atmosphere from the control chamber 2 and thus from both the port and starboard brake cylinders.

During both the application and release of the brakes fluid under pressure can be supplied to or released from the port or starboard brake cylinder only by rotating the operating handle 16 about its axis in one direction or the other so as to rotate the rotary valve member 4 thereby cutting off communication between the control chamber 2 and one or other of the brake cylinders as above described.

It will thus be seen that by the combination of the tilting movement of the operating handle from its vertical position and its rotational movement, the pressure conditions obtaining within either or both of the brake cylinders can be readily and completely controlled.

Pins 40 mounted in the cover plate 42 and subject to the pressure of coil springs 41, are provided with cone-shaped ends, adapted to engage in recesses in the valve 4 when the valve is in the position shown in the drawing. The pins thus serve as means for defining this operating position of the valve, so that the operator will know by the feel, that the valve has been turned to said position.

The improved controlling arrangements above described can evidently by suitable modification be applied to vacuum brakes and are not limited to the control of a single port and starboard brake on the under-carriage since if the latter is provided with more than a single pair of wheels each provided with braking equipment all the brake cylinders on the port and starboard sides of the under-carriage can be independently or simultaneously controlled in a similar manner to that above described.

The invention is furthermore not limited to the particular construction of controlling valve mechanism above described by way of example which may be modified in many respects without exceeding the scope of the invention.

Having now described my invention, what I claim as new and desire to secure by Letters Patent, is:—

1. In a brake for airplanes, the combination with two brake chambers operated by a variation in fluid pressure for applying the brakes, of valve means for varying the fluid pressure in said brake chambers, separate valve members for controlling communication through which fluid pressure is varied in said brake chambers and having one position in which the fluid pressure is varied in both brake chambers and another position in which the fluid pressure is varied in only one of said brake chambers, and a single manually operable means for operating both said valve means.

2. In a brake for airplanes, the combination with two brake chambers, of a valve for controlling the supply of fluid to said brake chambers, a separate valve having one position for establishing communication through which fluid is supplied to both brake chambers and another position in which communication is established to only one of said brake chambers, and a common manually operable means for operating both said valves.

3. In a brake for airplanes, the combination with two brake chambers, of an inlet valve for controlling the supply of fluid to said chambers, a separate exhaust valve for controlling the release of fluid from said chambers, an additional valve having a position for establishing communication through which fluid is supplied to and released from both brake chambers, and a position in which fluid is supplied to and released from only one brake chamber, and a single manually operable means for operating said valves.

4. In a brake for airplanes, the combination with two brake chambers, of a valve device comprising inlet and exhaust valves for controlling the supply and release of fluid under pressure to a chamber, a valve for controlling communication from said chamber to said brake chambers, and manually operated means for operating said supply and exhaust valves by a rocking movement and for operating the other valve by a rotary movement.

5. In a fluid pressure brake, the combination with an inlet valve for controlling the supply of fluid under pressure to a passage from which fluid is supplied to apply the brakes, a stem for operating said valve and valves for preventing leakage of fluid from said passage when the stem is moved either to open or to close said inlet valve.

6. In a fluid pressure brake, the combination with two brake chambers, of an inlet valve for controlling the supply of fluid to said brake chambers, a rotary valve for controlling communication through which fluid is supplied to said brake chambers, a stem for operating said inlet valve; and a manually operated member for rotating said rotary valve, and for operating said stem.

In testimony whereof I have hereunto set my hand, this 13th day of July, 1928.

HARRY J. WINTER.